United States Patent

[11] 3,580,278

[72] Inventor Lewis D. Bennett
 Dallas, Tex.
[21] Appl. No. 848,377
[22] Filed July 2, 1969
[45] Patented May 25, 1971
[73] Assignee Bennett Enterprises, Inc.
 Addison, Tex.

[54] FLUID-ACTUATED TRANSMISSION CONTROL
 11 Claims, 17 Drawing Figs.
[52] U.S. Cl. .................................................... 137/554,
 251/230
[51] Int. Cl. .................................................... F16k 37/00,
 F16k 31/44
[50] Field of Search .......................................... 251/58,
 230; 137/554

[56] References Cited
UNITED STATES PATENTS

| | | | |
|---|---|---|---|
| 1,302,538 | 5/1919 | Gulick | 137/413 |
| 2,964,061 | 12/1960 | Rawson et al. | 251/230X |
| 3,126,765 | 3/1964 | Conkle | 251/230X |
| 3,332,438 | 7/1967 | Abdullaev et al. | 137/554 |

*Primary Examiner*—Henry T. Klinksiek
*Attorney*—Cecil L. Wood

ABSTRACT: A pneumatic or hydraulic control mechanism for power shift transmissions of the type used in heavy duty power equipment, such as earth moving machines, cranes and material handling devices, marine equipment, deep well drilling rigs, and the like, whereby to control the movement of the range selector valve and insure proper function thereof when shifting from one transmission range to another, thus avoiding transmission failures, and possible damage thereto, through faulty manual shifting.

Patented May 25, 1971
3,580,278
7 Sheets-Sheet 1
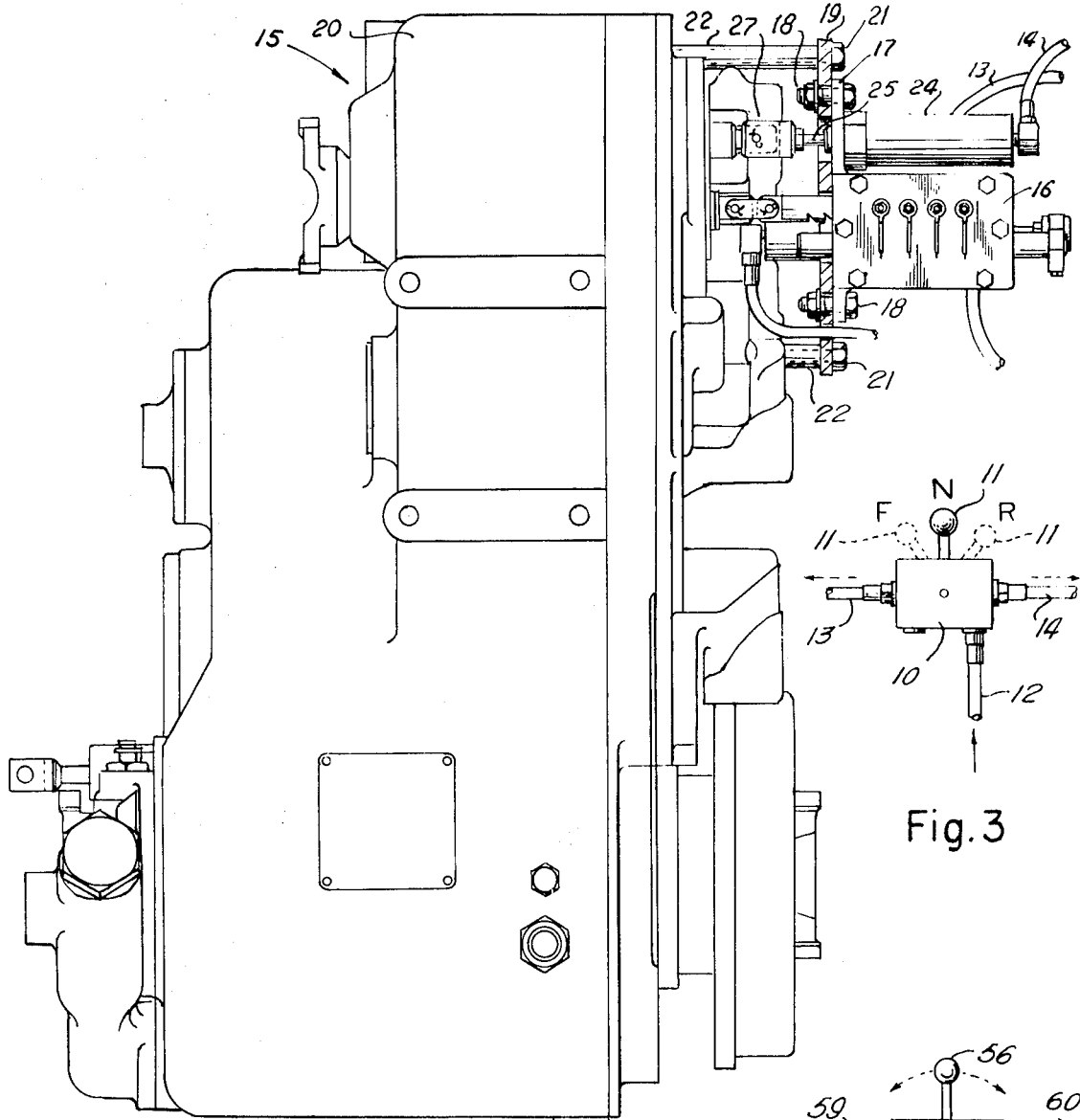
Fig.1
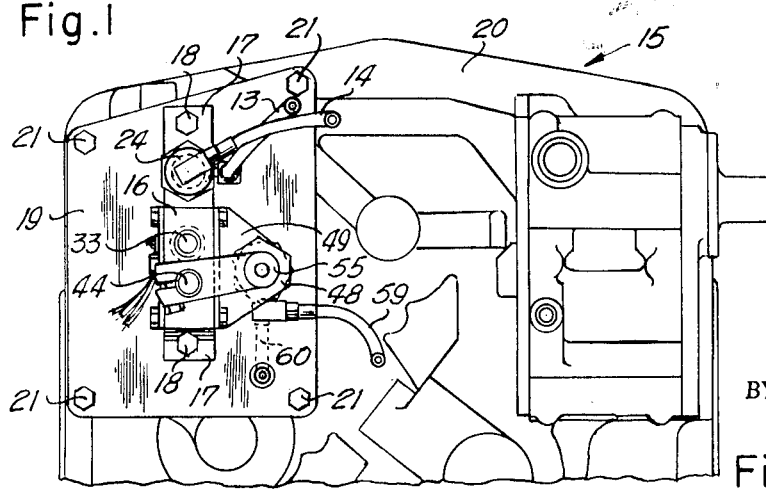
Fig.2
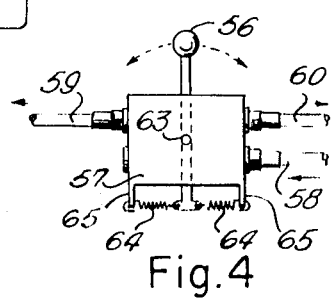
Fig.3
Fig.4
INVENTOR.
Lewis Dale Bennett
BY Cecil L. Wood
ATTORNEY INVENTOR.
Lewis Dale Bennett INVENTOR.
Lewis Dale Bennett
BY
*Cecil L. Wood*
ATTORNEY INVENTOR.
Lewis Dale Bennett

BY

ATTORNEY

INVENTOR.
Lewis Dale Bennett
BY
ATTORNEY 3,580,278

FLUID-ACTUATED TRANSMISSION CONTROL

BACKGROUND OF THE INVENTION

Power shift transmissions are widely used in all types of heavy machinery, such as construction, mining, logging, earth moving, and similar heavy-duty vehicles and machines, and are generally equipped with a manually operated range selector for shifting from one forward or reverse movement to another. Control systems for power shift transmissions are made available to the industry which are designed for air, hydraulic and electrical operation but such systems are either overcomplicated or have found some disfavor due to mechanical failures.

Such conditions are often encountered especially in the electric range selector system which must depend upon a constant electric power source for dependable operation, and when such source fails the transmission is inoperative. Air or hydraulic systems, properly designed, provide for greater dependability and insures a more positive action. The present invention is simple in design and operation and is capable of affording a positive response in operating the the range valve so that the shifting is smooth and rapid.

SUMMARY

This invention relates to fluid-actuated transmission control devices.

A primary object of the invention resides in the provision of a control mechanism for power shift transmissions of the type used in such heavy duty power equipment as earth-moving machines, cranes and material handling devices, and the like, whereby to positively control the movements of the range selector valve in the transmission to avoid overshifting when performed manually and insure against possible damage to the transmission.

Another object of the invention is that of providing a simple and compact control unit capable of installation in the fluid control lines of an existing transmission and adapted to monitor each forward or reverse movement of the impellant mechanism with accuracy and precision.

While the foregoing objects are paramount, other and lesser objects will become apparent as the description proceeds when considered in connection with the appended drawings wherein:

FIG. 1 is a side elevational view of the invention as applied to a conventional power shift transmission, the latter being shown in general outline.

FIG. 2 is an end view of the embodiment of the invention shown applied to a conventional power shift transmission.

FIG. 3 is a fragmentary view illustrating a conventional control level assembly by which the range selector valve is operated.

FIG. 4 illustrates a modified control lever assembly.

FIG. 13 is an exploded view of one of the pistons having the detent pawls mounted therein, as shown in FIG. 12.

FIG. 14 is an enlarged view of the selector valve control lever, similar to the device shown in FIG. 4.

Figure 5:
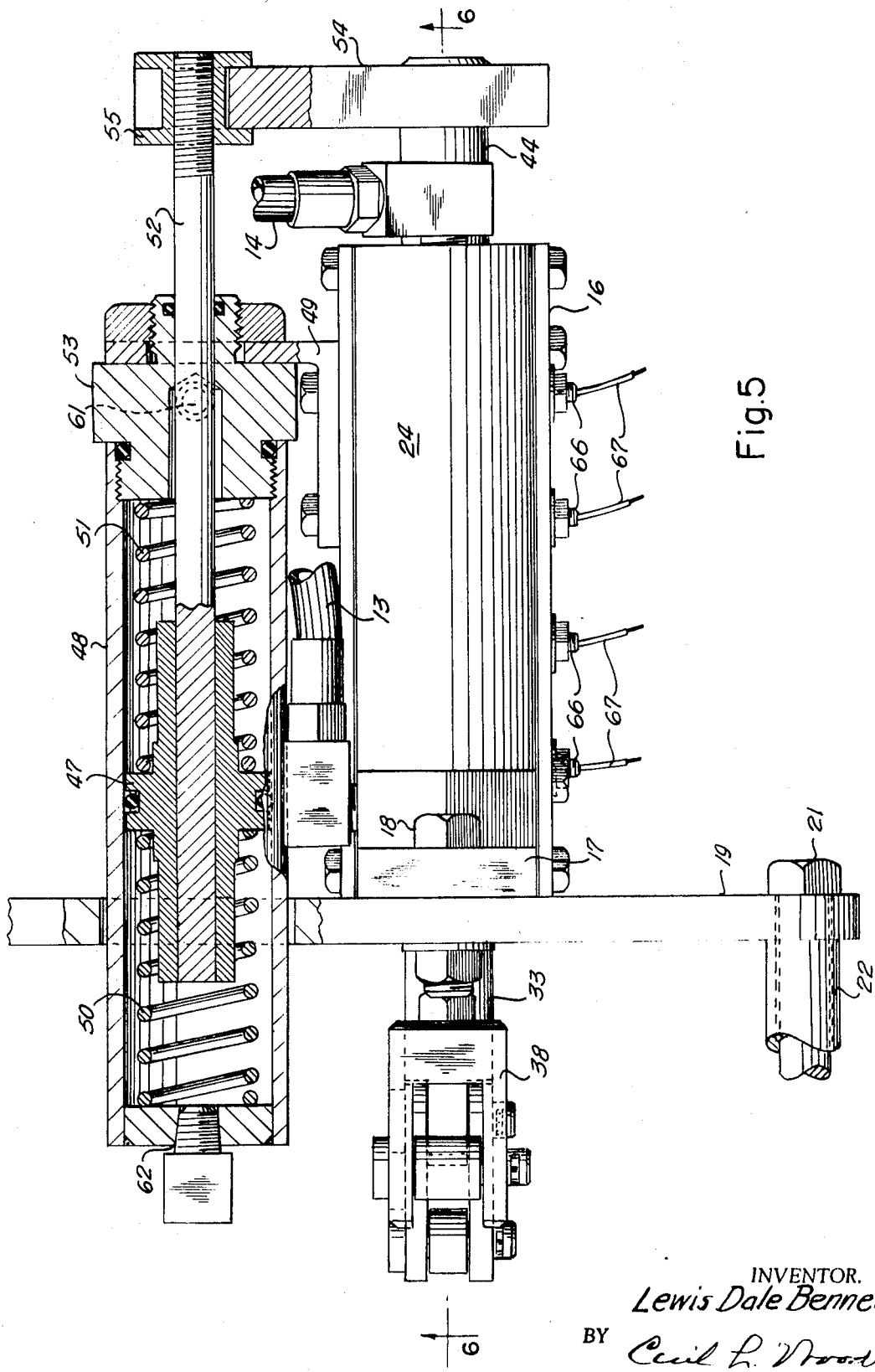
FIG. 5 is a longitudinal sectional view of the piston and cylinder assembly for actuating the multistage detention bar in the adjacent cylinder shown in elevation.

Two types of power shift transmissions are conventionally available to the industry, i.e., those having the reciprocal plunger control mechanism utilizing a fluid-actuated spool in a cylinder, and the rotary or oscillatory valve element on a shaft adapted for manual operation. The invention provides a range selector valve control for either of these types, the former being served by the structure of FIGS. 1, 2 and 5 through 8, and the latter by the structure of FIGS. 9 through 13 and 15 through 17.

In both types of power shift transmissions described herein the main valves are controlled by a lever assembly as shown in FIG. 3 which comprises a valve (not shown) enclosed within a casing 10 having a lever 11 which is manually moved from neutral to forward and reverse positions, as indicated by the letters "N," "F" and "R." A fluid supply line 12, and distribution lines 13 and 14 are connected into the valve within the casing 10, the direction of flow being indicated by arrows.

The plunger or piston type mechanism for operating the main valve of the transmission is illustrated in FIGS. 1 and 2 as applied to the transmission, which is generally designated by the numeral 15, with the range selector adapted for operation therewith, and which is shown in detail in FIGS. 5 to 8, comprising a housing 16 having a flanged base 17 secured by bolts 18 to a plate 19 which is mounted on the transmission housing 20 by elongated bolts 21 and spacer sleeves 22.

A bidirectional piston 23 for operating the main valve is arranged in a cylinder 24 which is secured to the base 17 of the housing 16, as shown in FIGS. 1, 2, 5 and 6, having the fluid lines 13 and 14 from the lever assembly, shown in FIG. 3, connected into the inner and outer ends thereof, respectively, to reciprocate the piston rod 25 which extends through an opening 26 in the plate 19 and is coupled to the valve rod (not shown) by a clevis 27.

Figure 6:
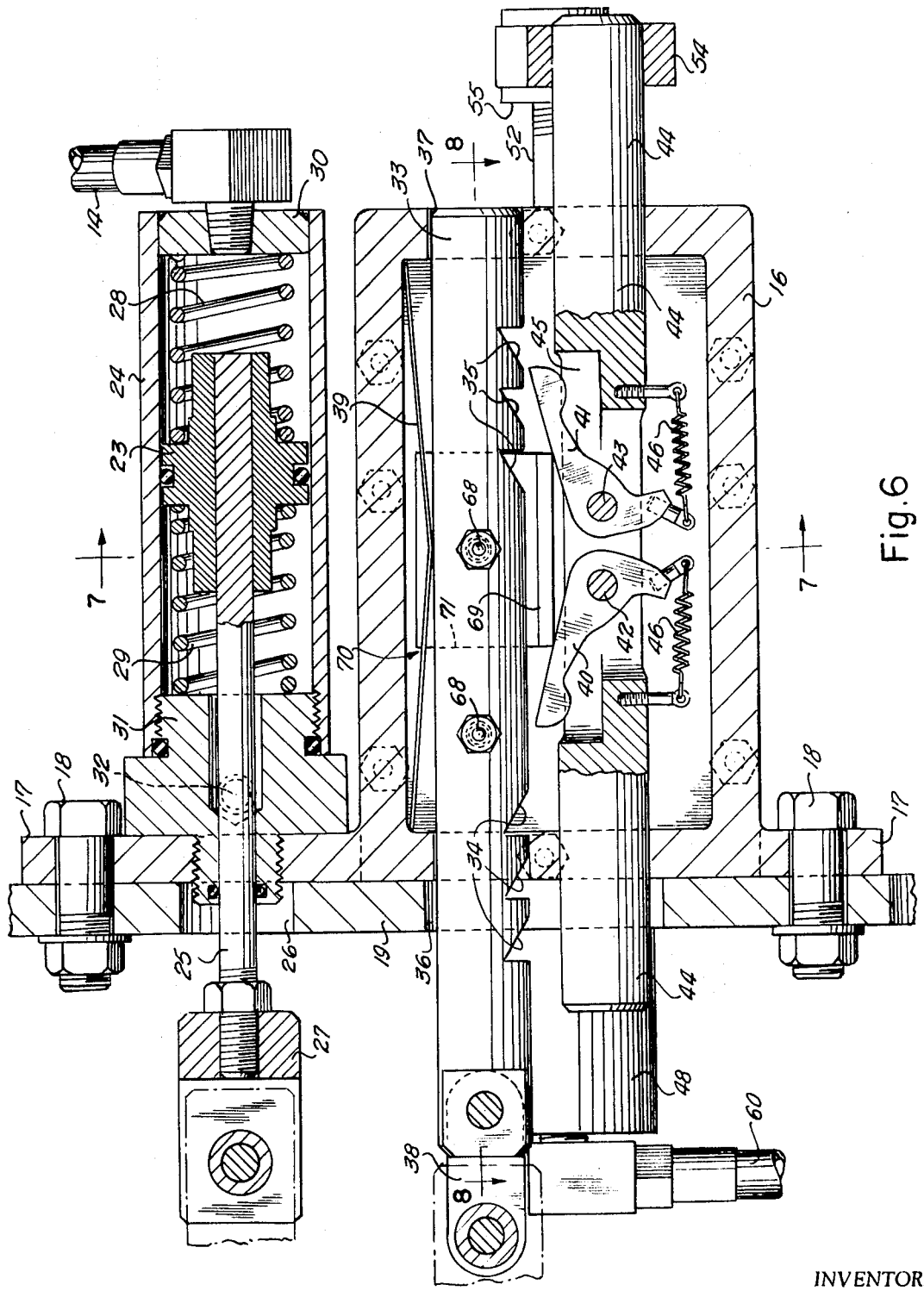
FIG. 6 is a longitudinal sectional view, on line 6—6 of FIG. 5, showing the detention bar and detent pawls in its casing, and an auxiliary piston and cylinder.

The piston 23, shown in FIG. 6 in its neutral position, is conventional in design and has compression springs 28 and 29 on each side. The cylinder 24 is closed by a plug 30 in its outer end and is threaded to a base element 31 at its inner end through which the rod 25 operates. The fluid line 13 is connected to a port 32 in the base element 31, as shown in broken lines in FIG. 6.

The invention is designed to provide a range selector mechanism by which each forward or reverse movement of the transmission can be carefully and smoothly accomplished after it is activated by manipulation of the main valve. The range selector (not shown) is operated by a detent rod 33 arranged for longitudinal movement within the casing 16, and is shown best in FIGS. 6 and 8. The rod 33 is preferably of round stock and has two spaced segments of a plurality of equidistantly spaced transverse notches 34 and 35 formed in one side thereof, each defined by an inclined surface terminating in an abutment perpendicular to the axis of the rod 33, and each segment of the notches 34 and 35 are opposingly formed, as shown in FIG. 6.

The detent rod 33 is slidable longitudinally in one side of the casing 16, extending through apertures 36 and 37 in the inner and outer ends thereof, respectively, and has its inner end connected by a clevis 38 to the range selector valve (not shown) in the transmission housing 20. Lateral tension is applied to the detent rod 33 by a leaf spring 39 in the casing 16, as apparent in FIG. 6, to insure stability in the sliding action of the rod 33, and to provide an electrical ground which will presently become apparent.

The detent rod 33 is moved longitudinally by pawls 40 and 41 pivoted on pins 42 and 43 arranged transversely through a pawl rod 44 slidably arranged in the casing 16 parallel to and spaced from the rod 33, the pawls 40 and 41 being arranged in a longitudinal slot 45 formed in the pawl rod 44 intermediate its ends. The pawls 40 and 41 are opposingly arranged and each is biased outwardly toward the detent rod 33 by a pull spring 46 having one end attached to the pawl rod 44 whereby the outer free ends of the pawls 40 and 41 can engage the notches 34 and 35 in their respective functions to limit the movement of the detent rod 33 to successive stages.

The pawl rod 44, which acts as an impellant for the detent rod 33, is moved by a bidirectional piston 47 of conventional design operating in a cylinder 48 supported by a bracket 49 attached to one side of the casing 16, as shown in FIG. 2. Compression springs 50 and 51 are arranged on each side of the piston 47 to normally retain it in its neutral position shown in FIG. 5.

The rod 52 of the piston 47 operates through a gland 53 threaded into the outer end of the cylinder 48 and is connected at its outer end to the pawl rod 44 by an arm 54 rigidly secured at one end to the outer end of the pawl rod 44 and having its opposite end bifurcated to embrace a peripherally grooved nut 55 threaded on the outer end of the piston rod 52, as best shown in FIG. 5.

The piston 47 is operated by the range selector lever 56 which actuates a valve (not shown) enclosed in the casing 57 or 126, as illustrated in FIGS. 4 and 14 respectively, having a supply line 58 connected therein and forward and reverse fluid lines 59 and 60 which are connected to the outer and inner ends, respectively, of the cylinder 47, in ports 61 and 62 therein. The lever 56 is pivoted at 63 in the casing 57, intermediate its ends, and projects therebelow, having pull springs 64 connecting it to depending portions 65 of the casing 57.

Figure 7:
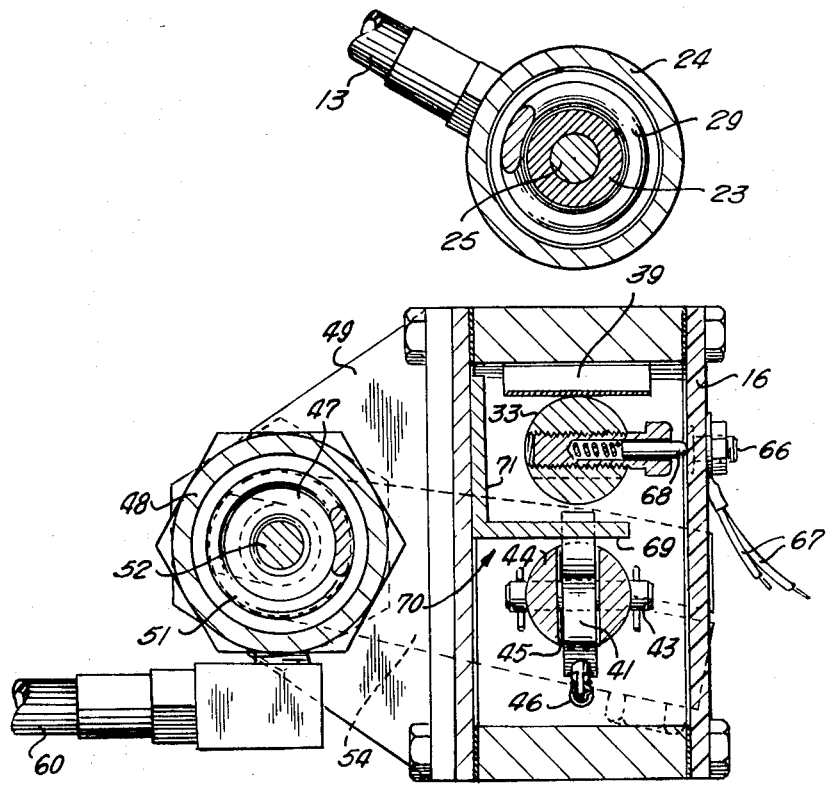
FIG. 7 is a transverse sectional view of the detention bar and its operating rod, on line 7—7 of FIG. 6, and showing the relative positions of the cylinders shown in FIGS. 5 and 6.
Figure 8:
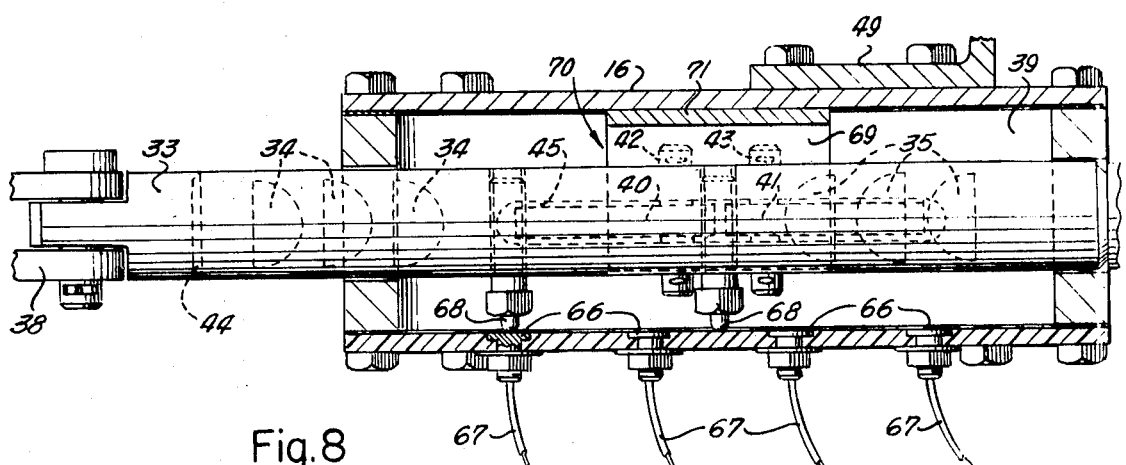
FIG. 8 is a longitudinal sectional view of the detention bar cylinder, on line 8—8 of FIG. 6, showing a series of electrical contacts to indicate the several positions of the detention bar in its longitudinal movement in the cylinder.

It is desirable to provide visual signals, such as lamps (not shown) to indicate the various positions of the detent rod 33 and thus determine the selected range of operation. A series of electrical contacts 66 are arranged along one wall of the casing 16 having conductors 67 connecting them to an electrical source (not shown), as indicated in FIGS. 5, 7 and 8, and yieldable sliding electrodes 68 are secured in the detent rod 33 and spaced to engage the contacts 66 at each stage of detention of the rod 33. The spacings of the contacts 66 correspond to the spacings of the notches 34 and 35 of the rod 33.

In FIG. 6 the pawls 40 and 41 are in neutral or inoperative positions, both being restrained by the ends of a right-angular flange 69 of a bracket 70 whose opposing flange 71 is secured, as by welding, to a wall of the casing 16, as shown more clearly in FIGS. 7 and 8. As the pawl rod 44 is moved inwardly or outwardly with respect to the flange 69 the respective pawls 40 and 41, under the influence of the springs 46, are urged toward the detent rod 33 and will engage one of the notches 34 or 35, depending on the direction of movement, whereby the detent rod 33 is moved by stages to operate the range selector valve (not shown).

Figure 9:
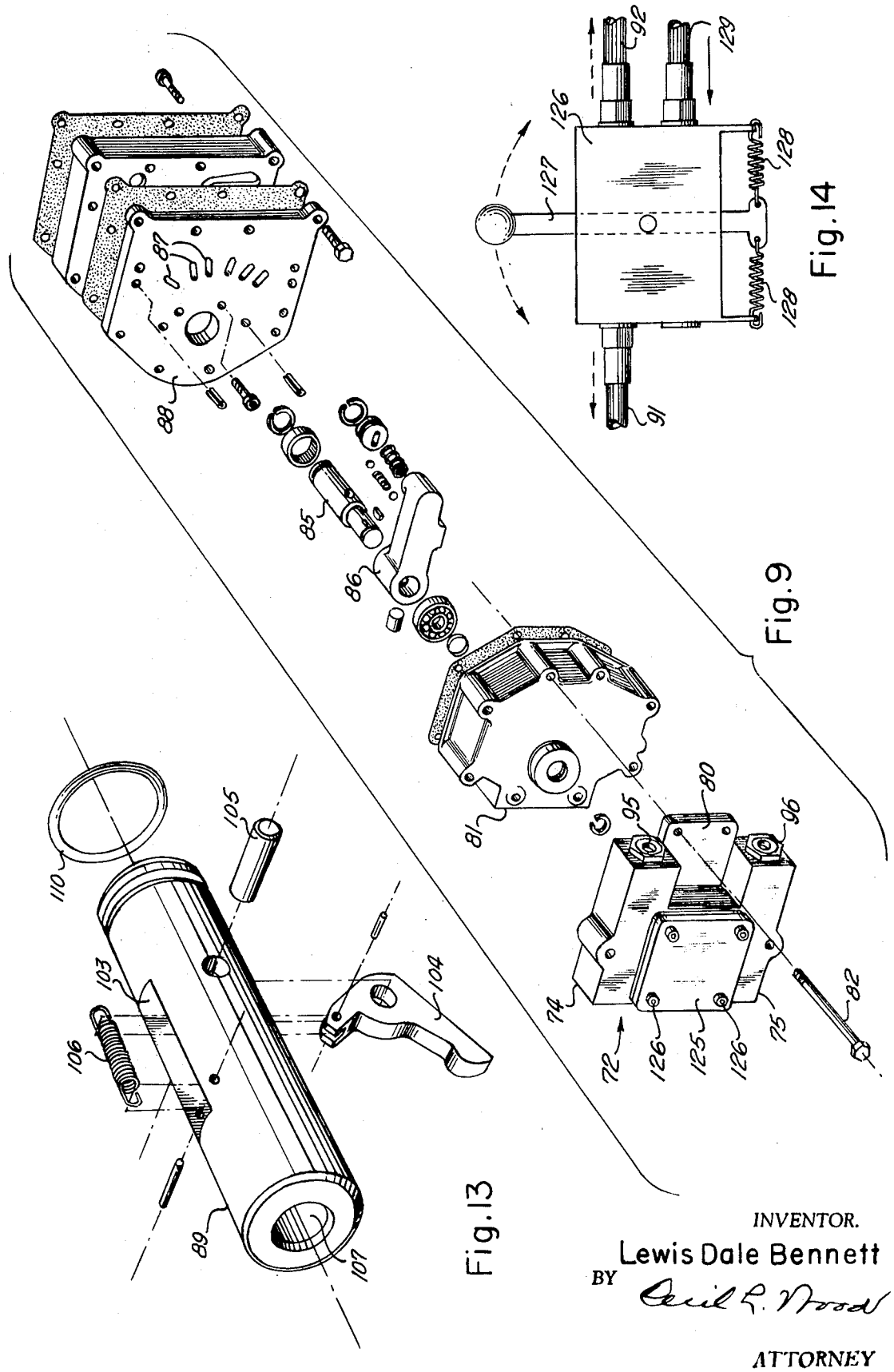
FIG. 9 is an exploded view of a typical rotative selector valve assembly for a power shift transmission, and showing the relative position of the invention as applied thereto.
Figure 10:
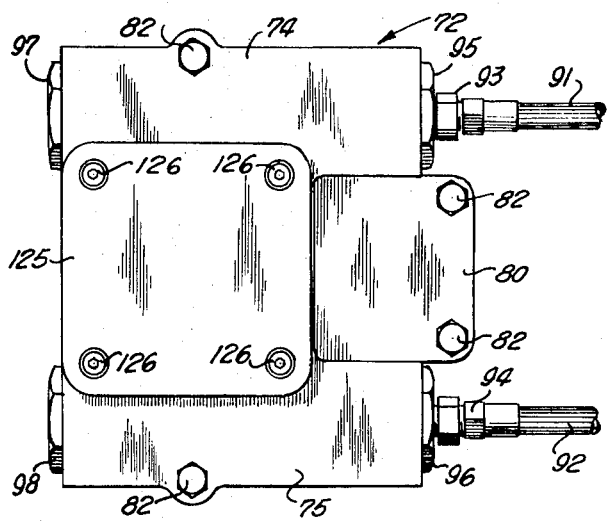
FIG. 10 is a top plan view of a modified form of the unit embodying the invention, as applied to the structure of FIG. 9.
Figure 11:
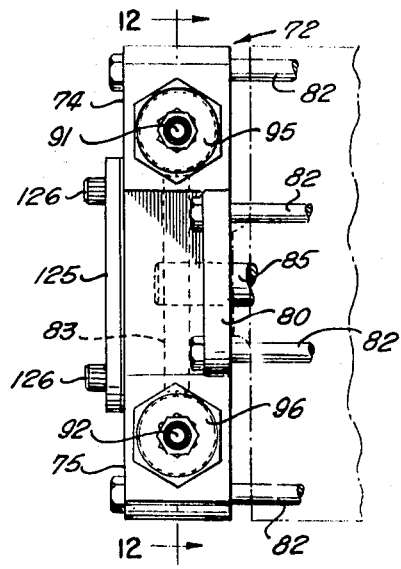
FIG. 11 is an end view of the structure shown in FIG. 10.

In FIGS. 9—13 and 15—17 is illustrated a rotary-type range selector mechanism for operating a selector valve on an oscillatory shaft, as shown in the exploded view of FIG. 9 in which the essential parts of a conventional range selector valve are depicted, and which are normally operated manually. The invention provides positive means for arresting the valve at each stage of adjustment to insure against "overadvancement" thereof which may damage the equipment it is designed to control.

Figure 12:
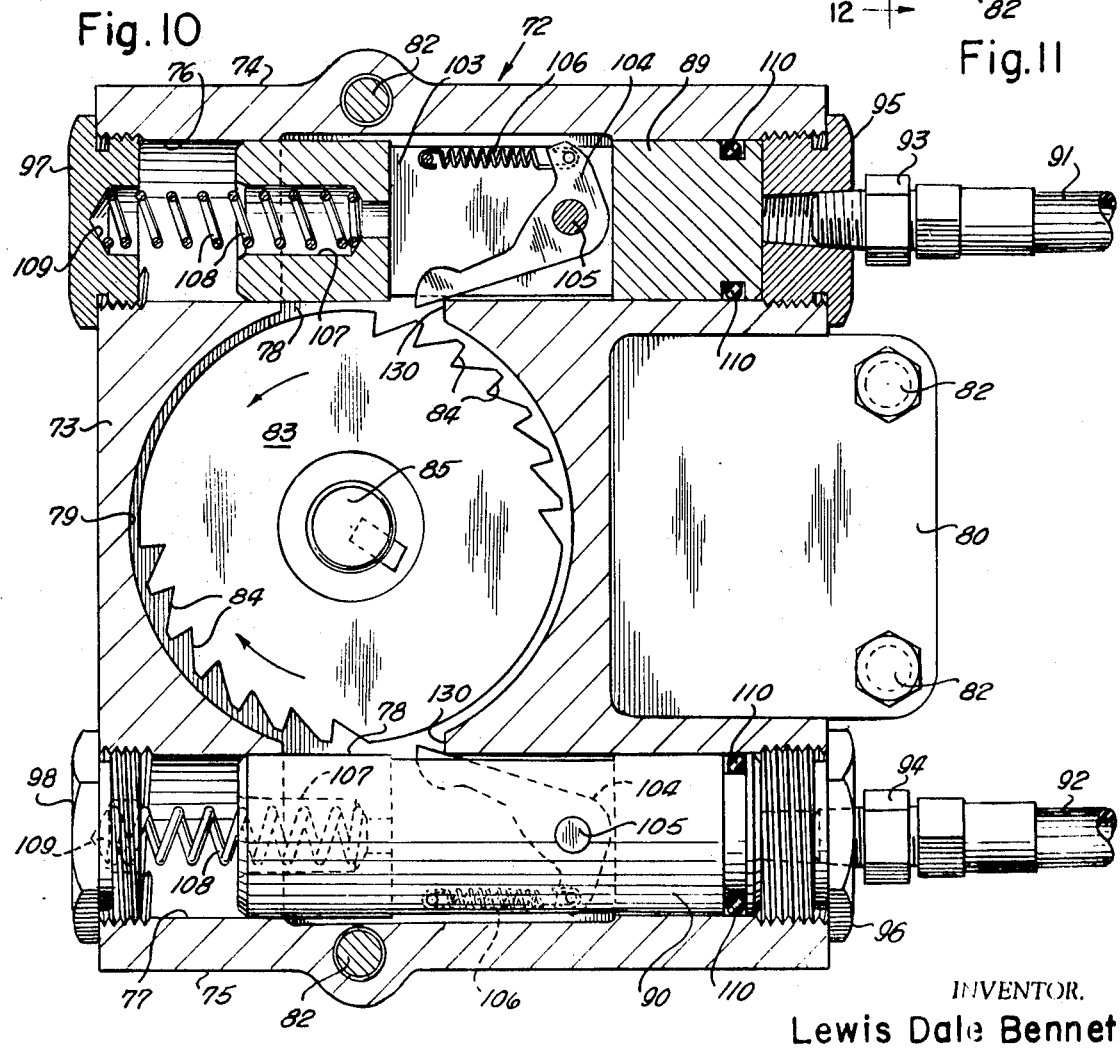
FIG. 12 is a sectional view, on line 12—12 of FIG. 11, showing a circular detention element having serrated segments, and showing a pair of detent pawls pivotally mounted in pistons operating in adjacent cylinders.
Figure 15:
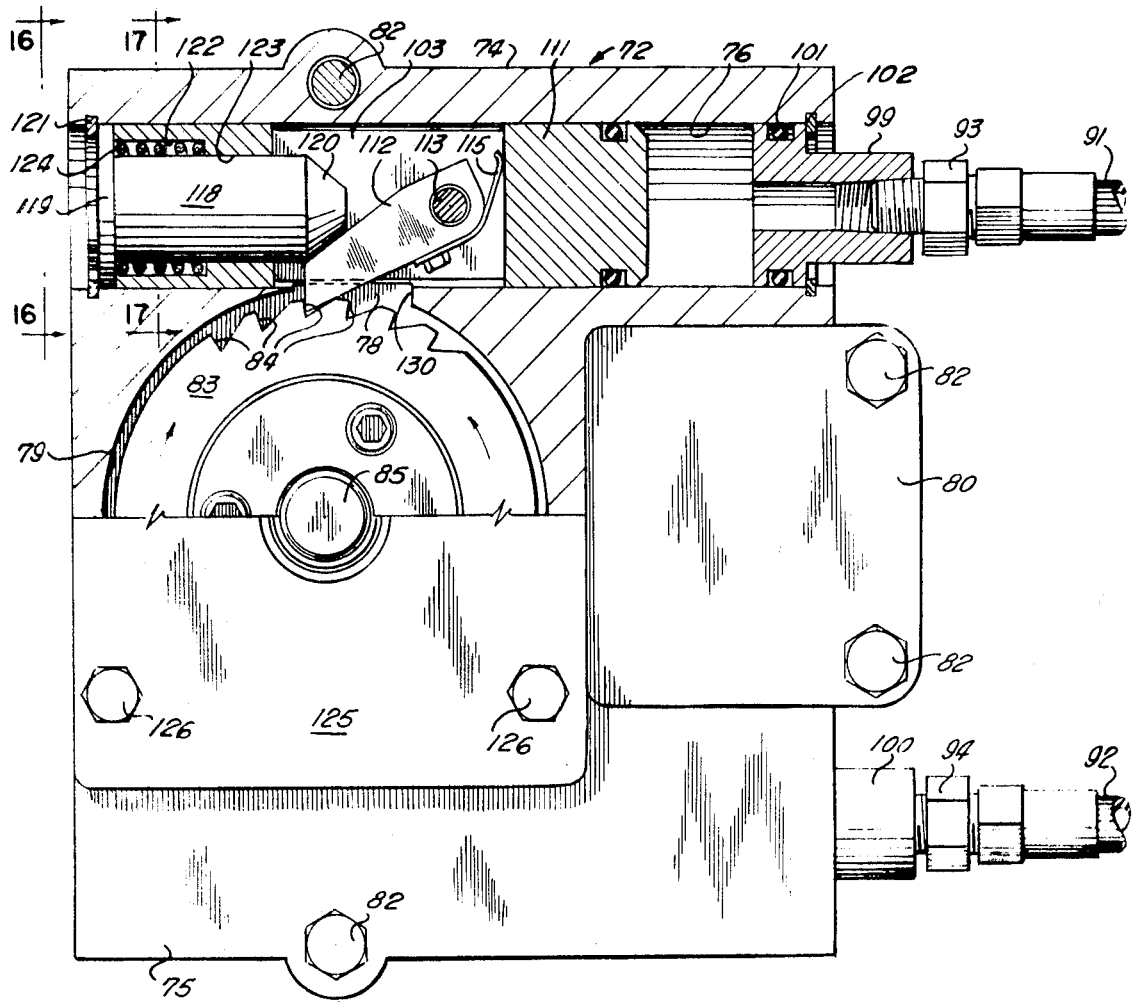
FIG. 15 is a side view of a modified form of the structure shown partially in section in FIG. 12, illustrating a guide element for the detent pawls operating with the detention element.
Figure 16:
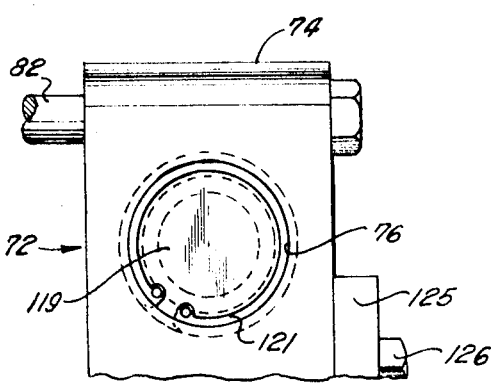
FIG. 16 is a fragmentary view of one end of one of the cylinders, on line 16—16 of FIG. 15.
Figure 17:
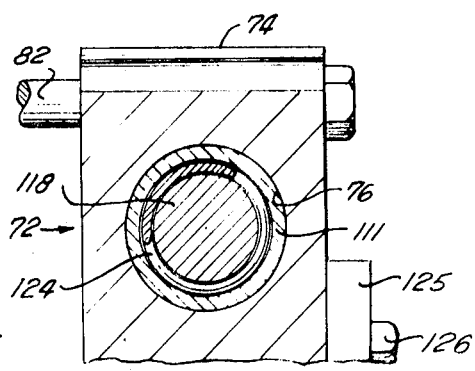
FIG. 17 is a fragmentary sectional view, on line 17—17 of FIG. 15, through one of the cylinders.

The modified selector control mechanism is enclosed within a housing 72, generally rectangular in form, having a substantially planar midportion 73 and side portions 74 and 75 having cylindrical bores 76 and 77, respectively, therethrough which communicate through slots 78 with a circular cavity 79 formed in the midportion 73, as best illustrated in FIGS. 12 and 15. A web 80 is formed with the housing 72 between the side portions 74 and 75 and projects beyond the ends thereof providing for attachment of the housing 72 to the cover 81 of a range selector valve assembly shown in FIG. 9 which is of conventional design. The housing 73 is attached to the cover 81 by elongated bolts 81.

A detent disc 83 is rotatively arranged in the cavity 79 and has diametrically opposed segments of ratchet-type serrations 84 thereon, the inclinations thereof in one segment being opposite to those of the other, as shown in FIG. 12. The disc 83 is adapted to be splined to the selector valve shaft 85, shown in FIG. 9, to rotate the range selector valve 86 over the arcuate arrangement of ports 87 in the baseplate 88 in the assembly shown in FIG. 9.

The cylindrical bores 76 and 77 have piston elements 89 and 90 therein, respectively activated by fluid pressure through conduits 91 and 92, respectively, connected through fittings 93 and 94 threaded into closure elements 95 and 96 threaded into the outer ends of the bores 76 and 77. Similar closures 97 and 98 are threaded into the opposite ends of the bores 76 and 77. The closure elements 99 and 100 for the bores 76 and 77 of the structure shown in FIG. 15 are modified to be sealed with O-rings 101 and secured in place by expansion rings 102.

The piston elements 89 and 90, shown in FIG. 12, are formed with elongated slots or cavities 103 transversely thereof intermediate their ends, each having a pawl 104 pivoted therein on a pin 105 arranged through the piston 89, and each pawl 104 is biased pivotally toward the slots 78 by pull springs 106 whereby to engage one of the serrations 84 when the piston element 89 or 90 moves inwardly. Each of the piston elements 89 and 90 has a cylindrical well 107 formed concentrically of its inner end to accommodate a compression spring 108 whose opposite end bears in a recess 109 in the closures 97 or 98. A sealing ring 110 is provided on each of the pistons 89 and 90.

The structure shown in FIG. 15 is modified in certain of its parts, and shows the piston element 111 in the sectional portion in its innermost position so that pawl 112 is engaged with one of the serrations 84 on the detent disc 83. The pawl 112 is pivoted on a pin 113 arranged transversely through an elongated slot 103 intermediate the ends of the piston element 111, similarly to that of the structure shown in FIG. 12, and is biased by a leaf spring 115 toward the slot 78 providing communication between the slot 103 and the circular cavity 79 in which the detent disc 83 is arranged, and which is identical to the structure shown in FIG. 15. As will become apparent, the pawls 104 (FIG. 12) and 112 (FIG. 15) are retracted into their respective slots by their engagement with the ends 130 thereof as the pistons are moved outwardly.

The inner end of the cylindrical bore 76, and its companion part (not shown) is closed by a plug 118 having a flanged base 119 and a frustoconical end 120. The plug 118 is inserted into the inner end of the bore 76 and secured by an expansion ring 121 against the flanged base 119. The piston element 111 has a well 122 formed in its inner end having a reduced portion 123 extending into the slot 103 so that the piston element 111, in its innermost position, will embrace the plug 118 in the manner shown in FIG. 15, and whereby the pawl 112 engages the frustoconical end 120 thereof in a cam action and force it into engagement with the serrations 84 and prevent further movement of the disc 83. A compression spring 124 is arranged about the plug 118 in the well 123 to return the piston element 111 to its inoperative position.

A cover plate 125 is applied to the housing 72 by Allen screws or bolts 126 to enclose the detent disc 83, as shown in FIGS. 10 to 17.

OPERATION

In FIGS. 4 and 14 is shown a manual valve assembly for operating the range selector valve control mechanism herein described. While the manual control valve may be identical for both structures herein shown and described, that shown in FIG. 4 has been designated as the device for the manual operation of the structure shown in FIGS. 1 through 13, and the assembly shown in FIG. 14 is designated for the operation of the structure shown in FIGS. 9 and 15 through 17.

In the operation of the mechanisms herein described, the main valve 10 having been manually operated to forward or reverse positions, illustrated in broken lines in FIG. 3, the structure shown in FIGS. 1, 2 and 5 through 8 is operated to actuate the plunger type range selector valve by manually moving the lever 56 to forward or reverse position, as indicated by the broken arrows in FIG. 4, depending upon the direction in which the controlled mechanism is operating as determined by the position of the lever 11 in the main valve control, shown in FIG. 4, so that the piston 47 is moved inwardly or outwardly causing the pawls 42 or 43 to engage the notches 34 or 35 on the detent rod 33 and move it only the distance equal to the spacing between the notches.

The lever 11 is then returned to its neutral position and repeatedly actuated until the limit of the required operation is accomplished. Each time the lever 11 is returned to its neutral position, as indicated in FIG. 4, the piston 23, under the influence of the springs 28 and 29, will return the pawl rod 44 to a position where it will locate the pawls 41 or 42 to engage a successive notch 34 or 35 to move the detent rod 33 in the desired direction, but only the distance of the spacing between the notches 34 or 35. The pawls 40 and 41 are retracted into the slot 45, in either direction in which the pawl rod 44 moves, by their engagement with the element 69.

The manual control device shown in FIG. 14 comprises a casing 126 which houses a valve (not shown) operated by a lever 127 in either direction, monitored by pull springs 128 biasing the lever 127 to neutral position, to cause the pressure fluid from a source to flow through a supply line 129 and out through the conduits 91 or 92 to the affected piston elements which move inwardly under pressure to cause the pawls 112 to engage the serrations 84 of the detent disc 83 to move it a distance equal to the spacing between the serrations 84. When acted on by the frustoconical end 120 of the plug 118, as indicated in FIG. 15, further travel of the pawls 112 to move the detent disc 83 in the direction of the arrows is prevented, depending upon which of the piston elements 111 is being actuated.

When the piston element 111 is retracted to its inoperative position by the spring 124 the pawl 112 will be retracted into the bore 76 by its engagement with the adjacent end 130 of the slot 78 against the tension of the spring 115 to inactivate it until the piston element is again advanced to the position shown in FIG. 15.

The invention, as shown and described, is capable of modification by persons skilled in the art without departing from its scope and intent.

I claim:

1. In a range selector for fluid actuated power shift transmissions having a manually operated main valve for forward and reverse movement, and a range selector valve, a fluid-actuated control device for said range selector valve, comprising, a detent element having an operative connection with said range selector valve, and having a plurality of notched segments formed thereon for engagement by pawls for moving said detent element by stages in either direction to intermittently open and close said range selector valve, a pawl operatively engageable with each of said segments, a fluid-actuated piston for operating said pawls into engagement with said segments to move said detent element in either direction to actuate said range selector valve, and a manual valve for operating said piston.

2. In a range selector control device, as described in claim 1, wherein the said detent element comprises a longitudinally operative rod having a linkage at one end with said range selector valve, and a pawl rod, having said pawls carried thereby, operatively connected at one end to said piston to cause said pawls to engage the notched segments on said detent rod to move it longitudinally and open and close said range selector valve through said linkage.

3. A device for controlling a range selector valve as described in claim 2, the said detent rod having two segments of notches thereon, the notches of one of said segments being engageable by a pawl for movement in one direction, and the notches of the other segment being engageably by another pawl for movement in the opposite direction, the movement of said detent rod being limited to a distance equal to the spacings between said notches in each engagement of a pawl therewith.

4. In a device for controlling a range selector valve, as described in claim 1, wherein the notches in each segment on said detent element are ratchetlike and wherein the inclination of said notches in one segment are opposed to those of another segment whereby said detent element is operative in either direction.

5. A device for controlling a range selector valve as described in claim 1, and a series of electrical contacts on said detent element having connection in an electrical circuit for providing a visual signal when said pawls engage each of the notches in said segments.

6. In a range selector for fluid actuated power shift transmissions having a manual main valve for forward and reverse movement of said transmission, and a range selector valve, a fluid-operated control mechanism for said range selector valve, comprising, a driven element having an operative connection with said range selector valve, the said element having a plurality of segments of ratchetlike equidistantly spaced notches thereon for engagement by pawls for moving said element in either direction, a plurality of pawls in operative relation to said element and engageable with the notches thereon, fluid-actuated piston means for moving said pawls into engagement with said notches to move said element and operate said range selector valve in intermittent stages, and a manual valve for operating said piston means.

7. In a range selector valve control mechanism as described in claim 6, wherein the driven element is a disc having a driving connection with said range selector valve, and the said segments are formed on opposing sides of said disc.

8. In a control device for a range selector valve as described in claim 6, wherein the said valve has a shaft and said disc is drivingly connected to said shaft, and where each of said pawls is carried by a fluid-actuated piston in operative relation to said disc.

9. A control device for a range selector valve as described in claim 6, wherein a piston having a pawl pivotally mounted therein is operatively arranged on each side of said detent element whereby the pawl in each piston can engage the notches in said element on the side thereof adjacent to each pawl.

10. A control device as described in claim 9, and means cooperating with each of said pistons for limiting the travel of said pawls while engaged with the notches in said detent element.

11. A control device for a range selector valve as described in claim 6, the said manual valve for operating said piston means having a lever operative in one direction for operating one piston and in an opposite direction for operating the other piston, the said lever having a neutral position and returnable thereto for each successive movement of either piston.